US007349782B2

(12) United States Patent
Churchill et al.

(10) Patent No.: US 7,349,782 B2
(45) Date of Patent: Mar. 25, 2008

(54) DRIVER SAFETY MANAGER

(75) Inventors: Barbara J. Churchill, Cary, NC (US); Alexander Faisman, Croton-on-Hudson, NY (US); Dimitri Kanevsky, Ossining, NY (US); David Nahamoo, White Plains, NY (US); Roberto Sicconi, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 10/790,343

(22) Filed: Feb. 29, 2004

(65) Prior Publication Data

US 2005/0192730 A1 Sep. 1, 2005

(51) Int. Cl.
*B60R 22/00* (2006.01)

(52) U.S. Cl. .............................. 701/45; 701/2; 701/29; 701/36; 701/46; 340/438; 340/439

(58) Field of Classification Search .................. 701/29, 701/33, 34, 36, 45, 65, 2, 46; 340/425.5, 340/436, 438, 439
See application file for complete search history.

(56) References Cited

U.S. PATENT DOCUMENTS 6,236,968 B1 5/2001 Kanevsky et al.
6,421,453 B1 7/2002 Kanevsky et al.
6,442,519 B1 8/2002 Kanevsky et al.
6,484,136 B1 11/2002 Kanevsky et al.
6,505,208 B1 1/2003 Kanevsky et al.
6,529,871 B1 3/2003 Kanevsky et al.
6,529,902 B1 3/2003 Kanevsky et al.
2004/0209594 A1* 10/2004 Naboulsi ................. 455/404.1
2005/0137753 A1* 6/2005 Basson et al. ................. 701/1

OTHER PUBLICATIONS

L. Comerford, D. Frank, P. S. Gopalakrishnan, R. Gopinath, J. Sedivy. "The IBM Personal Speech Assistant," ICASSP 2001, Salt Lake City, UT, May 2001.
Johnston, M. and S. Bangalore. 2000. Finite-state Multimodal Parsing and Understanding. In Proceedings of COLING-2000 (this volume).
"Motorola Integrates IBM Software into Interactive Telematics System." http://www-306.ibm.com/software/pervasive/news/press_releases/motorola_0101.shtml. Copy retrieved . . . . . . . Jan. 9, 2006 from http://www-03.ibm.com/press/us/en/pressrelease/1439.wss.

* cited by examiner

*Primary Examiner*—Gertrude A. Jeanglaude
(74) *Attorney, Agent, or Firm*—Ference & Associates LLC

(57) ABSTRACT

A unified approach that permits the consideration of different issues and problems that affect driving safety. Particularly, there is proposed herein the creation of a driver safety manager (DSM). The driver safety manager embraces numerous different factors, multimodal data, processes, internal and external systems and the like associated with driving.

26 Claims, 5 Drawing Sheets

DRIVER SAFETY MANAGER

FIELD OF THE INVENTION

The present invention relates generally to "telematics" technology and, particularly, to issues relating to driver safety. ("Telematics" is a commonly recognized designation that refers to the integration of wireless communication, vehicle monitoring systems and location devices.)

BACKGROUND OF THE INVENTION

Safe driving continues to be a major issue addressed by automobile manufacturers. With the development of more "telematics" technology in cars, there are increasing risks for drivers to be distracted. (The term "car" and its constituent grammatical forms can be understood herein as relating to automobiles and other commercially sold and distributed vehicles normally associated with private use, such as sedans, coupes, SUV's, minivans, pickups, etc.)

Normally, safe driving can be influenced by a large number of factors. The following are but a few examples:

a) Distractions from telematics devices (e.g. navigation system, telephones, radio controls, window controls)

b) Impaired driver states such as fatigue, drowsiness, and inattention.

c) Distracting processes (e.g. talking, applying the brakes).

d) Stress on the vehicle (e.g. speed, acceleration) and environmental characteristics (e.g., weather, positions of other cars).

e) Stress on the driver (e.g. drivers becoming involved in several tasks, such as making U-turns, trying to remember which voice command can turn off the radio, getting a cellular telephone to dial a call, etc.)

There are also plans in conjunction with telematics that would allow to drivers to communicate between themselves while they drive, that is, between one driver and another.

The known technology to reduce the risks described above includes a workload manager that has information, from different car sensors, about how burdened the driver may be at a given point in time. This technology allows, for example, for the blocking of an incoming telephone ring in a car if the driver presses brakes or turns the car. A primary disadvantage of these technologies is that they do not attenuate the risks presented to other drivers who may be near or passing a car where another driver is busy with playing games, listening to books or performing a telephone conversation. It would thus appear to be helpful at times to inform a driver about such risks associated with drivers in other cars.

In some countries, it is required that if drivers are younger than 17 then a mark is provided on the car to indicate this. In Russia (at least in Soviet times), it was required that if a driver is hearing impaired then information to the effect was placed on the back of the window in his or her car. For the most part, these methods are not sufficient. First, the markings or signs can be seen only when a driver in another car actually looks in their direction. Secondly, such labels are not dynamic and, thus, reflective only of a particular, fixed situation (such as the age of a driver). A need has thus been recognized in connection with providing a more dynamic arrangement for highlighting a variety of potentially dangerous situations to drivers of other cars and for ensuring that drivers of other cars do not have to actually look at a car (that presents risks) in order to get such information.

Among the efforts presented in this general direction, U.S. Pat. No. 6,236,968 ("Sleep prevention dialog based car system") suggests fighting drowsiness by detecting drowsiness via speech biometrics and, if needed, by increasing arousal via speech interactivity. However, this method is highly limited in the context of attempting to solve all of the problems (a) through (e) outlined above. For example, inattention cannot be solved merely by interactive speech games, since a driver can easily play in speech game while simultaneously averting his/her attention from the road.

Other known methods are directed to the reduction of driver "workload" (or "cognitive load"). For example, some states prohibit the use of hand held telephones in cars by a driver. Some states even prevent telephone dialing if a driver has a high workload (e.g. accelerating, turning left) and/or if there is a heavy rain or fog. These rules are still not sufficient for safe driving overall since they do not cover other possible dangerous situations. Further, rules have not yet addressed all potentially dangerous driving situations since there are a very large number of factors that potentially affect safe driving, not all of which are yet well understood.

One of the ways to reduce driver cognitive workload is to allow the driver to speak naturally when interacting with a car system (e.g. when playing voice games, issuing commands via voice). It is difficult for a driver to remember a complex speech command menu (e.g. how to ask "What is the distance to JFK?" or "Or how far is JFK?" or "How long to drive to JFK?" etc.). This requires development of conversational interactive (CI) speech systems. CI speech systems can significantly improve a driver-vehicle relationship and contribute the driving safety. But the development of NLU (natural language understanding) for CI is the difficult problem.

One possible method for improving NLU is data collection. It is difficult to collect sufficient data that fully represents all possible ways how users might interact with CI system. But the problem with data collection is that no matter how large the data collection is, some users can produce some phrases that are not represented in the collected data nor in grammars that are developed from this data.

There is also a general assumption that the driver workload should not exceed a certain threshold in order that a driving could be safe but to date no well-established methods for measuring driver workload appear to have been suggested.

SUMMARY OF THE INVENTION

Broadly contemplated herein is a unified approach that permits the consideration of different issues and problems that affect driving safety. Particularly, there is proposed herein the creation of a driver safety manager (DSM). The driver safety manager embraces numerous different factors, multimodal data, processes, internal and external systems and the like associated with driving.

In summary, one aspect of the invention provides a system for ensuring driver safety in a vehicle, the system comprising: an arrangement for communicating with a plurality of systems impacting driver safety; the communicating arrangement being adapted to receive, from the plurality of systems impacting driver safety, information on current conditions relevant to driver safety; an arrangement for evaluating whether driver safety is at risk, based on information received by the communicating arrangement; and an arrangement for performing operations to ensure driver safety, responsive to the evaluating arrangement.

Another aspect of the invention provides a system for ensuring driver safety in a plurality of vehicles, the system comprising: an arrangement in each vehicle for communicating with a plurality of systems impacting the safety of drivers in the plurality of vehicles; the communicating arrangements being adapted to receive, from the plurality of systems impacting driver safety, information on current conditions relevant to driver safety; an arrangement for evaluating whether the safety of one or more drivers is at risk, based on information received by the communicating arrangements; and an arrangement for performing operations to ensure driver safety, responsive to the evaluating arrangement.

A further aspect of the invention provides a method of ensuring driver safety in a vehicle, the method comprising the steps of: providing an arrangement for communicating with a plurality of systems impacting driver safety; with the communicating arrangement, receiving, from the plurality of systems impacting driver safety, information on current conditions relevant to driver safety; evaluating whether driver safety is at risk, based on information received by the communicating arrangement; and performing operations to ensure driver safety, responsive to the evaluating arrangement.

Yet another aspect of the invention provides a method of ensuring driver safety in a plurality of vehicles, the method comprising the steps of: providing an arrangement in each vehicle for communicating with a plurality of systems impacting the safety of drivers in the plurality of vehicles; with the communicating arrangements, receiving, from the plurality of systems impacting driver safety, information on current conditions relevant to driver safety; evaluating whether the safety of one or more drivers is at risk, based on information received by the communicating arrangements; and performing operations to ensure driver safety, responsive to the evaluating arrangement.

A yet further aspect of the invention provides a program storage device readable by machine, tangibly embodying a program of instructions executable by the machine to perform method steps ensuring driver safety in a vehicle, the method comprising the steps of: providing an arrangement for communicating with a plurality of systems impacting driver safety; with the communicating arrangement, receiving, from the plurality of systems impacting driver safety, information on current conditions relevant to driver safety; evaluating whether driver safety is at risk, based on information received by the communicating arrangement; and performing operations to ensure driver safety, responsive to the evaluating arrangement.

Furthermore, an additional aspect of the invention provides a program storage device readable by machine, tangibly embodying a program of instructions executable by the machine to perform method steps for ensuring driver safety in a plurality of vehicles, the method comprising the steps of: providing an arrangement in each vehicle for communicating with a plurality of systems impacting the safety of drivers in the plurality of vehicles; with, the communicating arrangements, receiving, from the plurality of systems impacting driver safety, information on current conditions relevant to driver safety; evaluating whether the safety of one or more drivers is at risk, based on information received by the communicating arrangements; and performing operations to ensure driver safety, responsive to the evaluating arrangement.

For a better understanding of the present invention, together with other and further features and advantages thereof, reference is made to the following description, taken in conjunction with the accompanying drawings, and the scope of the invention will be pointed out in the appended claims.

BRIEF OF THE DRAWINGS

DESCRIPTION OF THE PREFERRED EMBODIMENTS

Figure 1:
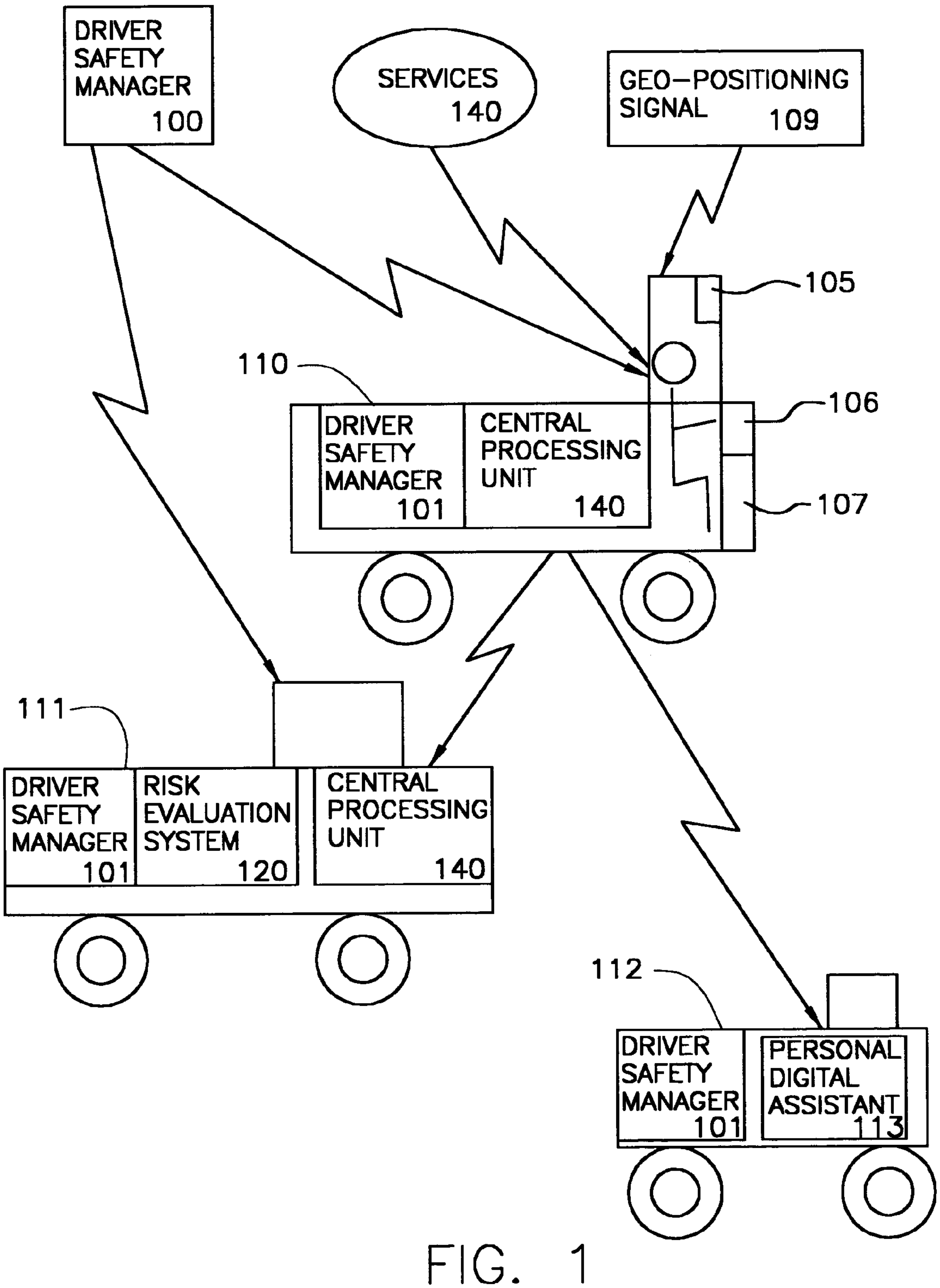
FIG. 1 is a general block scheme of a multiple DMS system.

FIG. 1 is a general block scheme of a system of multiple Driving Safety Managers. The driver safety manager (101) is a computer system that can be located on a server (100) outside of any cars. DSM (101) can also be located inside different cars (110), (111), (112). DSM (101) may preferably have components that are embodied as wearable devices and/or PDA's (such as that indicated at [113] in car [112]).

A driver safety manager (DSM) addresses numerous different factors, multimodal data, processes, internal and external systems associated with driving. Preferably, DSM (101) is equipped with a communication arrangement (130) that can receive from different systems and send particular information to them, listen to audio devices (e.g. speaker 106), and watch video devices and sensors such as a camera (105). DSM (101) can also communicate with services that are associated with cars but located not in cars, e.g. navigation services (140), and a GPS (109). Some of the systems with which DSM (101) can communicate are either other safety manager systems (located in different cars or on servers) (e.g., in car [111] or [112]) or internal modules and devices such as risk evaluation systems (RES) (120).

DSM interaction with drivers and the systems are aimed to evaluate and decrease a risk of traffic accidents. One of the tasks of DSM (101) is to estimate various parameters that affect driving safety. Examples of such parameters are a driver cognitive load, stresses of a driver's car and other cars around the driver. DSM (101) also can suggest that drivers perform some actions, warn drivers about specific factors (e.g. about other cars that have higher risk), and verify driver identities (e.g. to determine driving history).

An important component of DSM (101) is a driving risk evaluator (RES) (120). Its task, essentially, is to evaluate and decrease the risk of traffic accident by producing measurements related to driver and car stress, driver cognitive workloads, environmental factors, etc.

Another task of DSM (101) is the recording and archiving of data related to driver and car behavior for later processing, and the evaluation and modification of modules affecting driving quality and the reduction of traffic accident risks.

Figure 2:
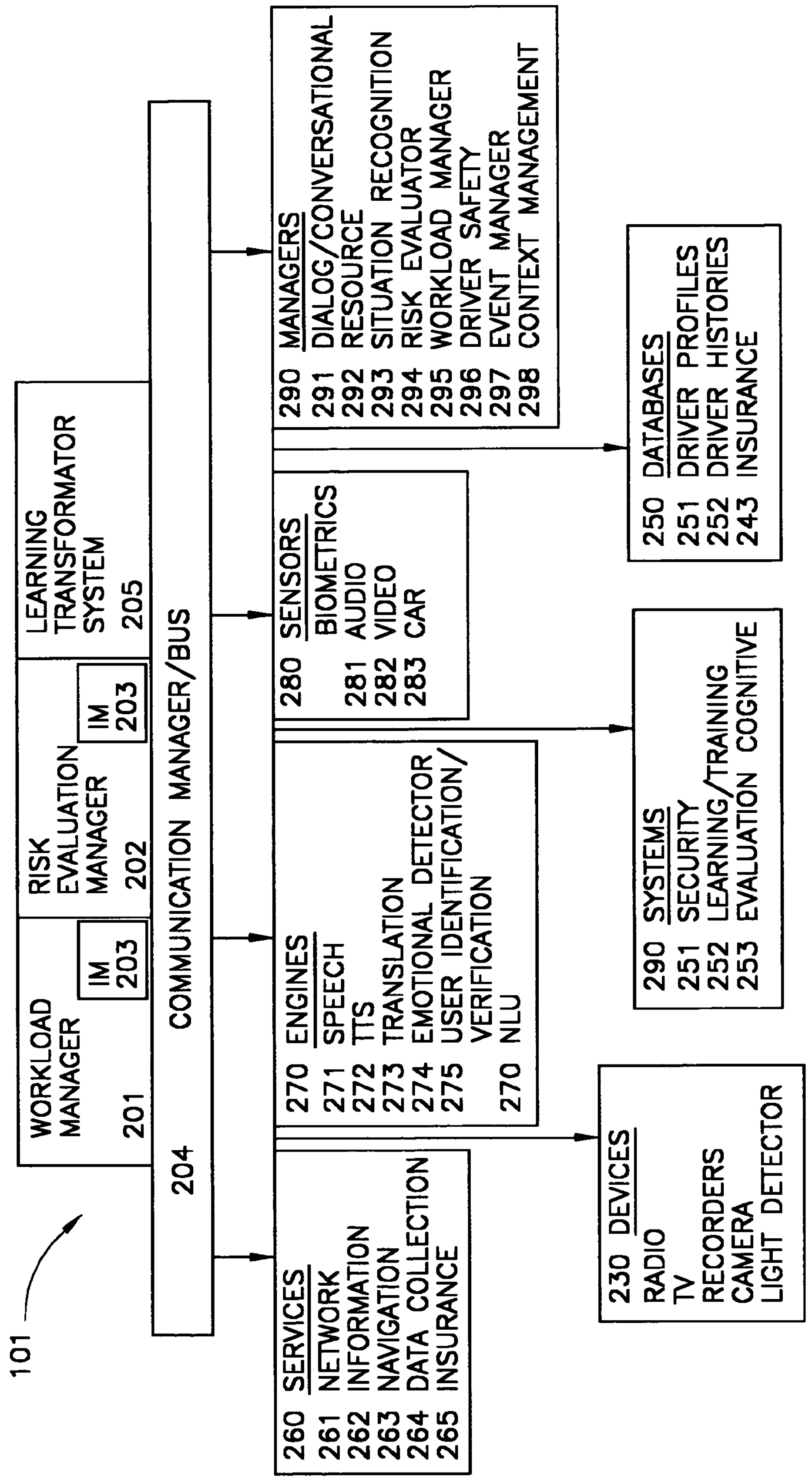
FIG. 2 is a general block scheme of a single DSM.

FIG. 2 is a general block scheme of a single DSM.

The most basic components of DSM (101) are a workload manager (WM) (201), a risk evaluation manager (REM) (202), a training/learning manager (205) and an interface manager/bus (203). The structures that can interact or communicate with SDM are divided into several groups: services (260), engines (270), sensors (280), managers (290), systems (250), devices (230) and databases (240).

The communications manager/bus (203) allows DSM to communicate with structures inside a user's car and outside of this car. The communications module (203) not only allows DSM to communicate with external and internal structures but different elements of the structures can communicate between themselves via the communications bus (203). The communications manager can exchange different kind of media (e.g., process audio, video, radio signals, infra rays, etc.) and communicate with different kind of systems, modules and devices (e.g. listen to audio devices and audio sensors like radio, recorders, sound detectors etc. or connect with video devices like camera, light detectors etc. The communication manager uses network and network services to exchange media. One possible implementation can be the local area network (like blue tooth etc.) that is created in a cluster of neighboring cars. This would allow, for example, the interchanging of information from workload managers located in such cars.

An object of the workload manager (201) is to determine a moment-to-moment analysis of the user's cognitive workload. It accomplishes this by collecting data about user conditions, monitoring local and remote events, and prioritizing message delivery. There is rapid growth in the use of sensory technology in cars. These sensors allow for the monitoring of driver actions (e.g. application of brakes, changing lanes), provide information about local events (e.g. heavy rain, and provide information about driver characteristics (e.g. speaking speed, eye closing). There is also growing number of distracting information that may be presented to the driver (e.g. phone ring, radio, music, e-mail etc.) and actions that a driver can perform in cars via voice control. The relationship between a driver and a car should preferably be consistent with the information from sensors. The workload manager (201) can preferably be designed in such a way that it could integrate sensor information and rules on how the sensor information can affect when and if distracting information is delivered. One can contemplate here a "workload representational surface". One axis of the surface would represent stress on the vehicle and another, orthogonally distinct axis, would represent stress on the driver. Values on each axis could conceivably run from zero to one. surface represents a car stress and the other axis represents a driver stress. Conceivably, this surface could be something other than flat; since it is a plot of undertaken measurements, it may well be "curved". Maximum load would be represented by the position where there is both maximum vehicle stress and maximum driver stress, beyond which there would be "overload".

The workload manager (201) is closely related to the event manager (297) that detects when to trigger actions and/or make decisions about potential actions. The system preferably uses a set of rules for starting and stopping the interactions (or interventions). It can utilize answers from the driver and/or data from the workload manager relating to driver conditions. The system will preferably analyze answers from the driver, compute how often the driver answered correctly and the length of delays in answers, etc. It preferably interprets the status of a driver's alertness, based on his/her answers as well as on information from the workload manager. It will preferably make decisions on whether the driver needs additional stimuli and on what types of stimuli should be provided (e.g. verbal stimuli via speech applications or physical stimuli such as a bright light, loud noise, etc.) and whether to suggest to a driver to stop for rest. Data items in the system can be identified using XML descriptions. The system preferably permits the use and testing of different statistical models for interpreting driver answers and information about driver conditions.

A driving risk evaluator (RES) (202) is an important component of DSM (101). Preferably, its task will be to evaluate the potential risk of a traffic accident, and then if needed decrease the same by producing measurements related to stresses on the driver and/or vehicle, the driver's cognitive workload, environmental factors, etc. RES (202), then, helps workload manager (201) with detecting, predicting and decreasing driver fatigue and increasing driver attention, and possible in preventing the driver from falling asleep.

Preferably, another important module of DSM (101) will be a learning transformator system (LT) (205). Preferably, its tasks are to: monitor across network, driver and passenger actions, in the car's internal and external environments; extract and record the DSM relevant data in databases; and generate and learn patterns from stored data and learn from this data how DSM components and driver behavior could be improved and adjusted to improve DSM performance and improve driving safety. In particular, LT (205) can preferably modify NLU components, such as tables which include typical phrases that are linked with commands. For example, LT (205) could add to NLU tables new phrases that it finds from some drivers' dialogs or from more sophisticated automatic language model (LM) and NLU processors. And if the number of phrases in some table become very large (that might lead to increase in speech recognition error rate), then LT (205) could preferably split tables by topics and adapt or create new grammars for domain related to such created topics. Examples of some technology that can be used for such topic identification are provided not only in other patent references mentioned herein but also in U.S. Pat. No. 6,529,902 ("Method and system for off-line detection of textual topical changes and topic identification via likelihood based methods for improved language modeling").

In this connection, it should be appreciated that a table contains typical phrases that a driver may utter, and there can be several tables containing phrases. Each table corresponds to some topic. For example, one table can contain phrases that a driver usually utters for navigation when he/she drives (e.g., "Where is the closest restaurant?"). Another table could conceivably contain phrases that a driver would utter when he/she wants to play music (e.g., "Play me some . . . "). Phrases in each table are presented in a special grammar form. For example, a table could contain phrases such as, "Give me the directions to <something>", "Where is <something>?", etc. The NLU decoder usually first identifies the topic of conversation. For example it could identify that the driver's need at a given time is to navigate. Then, when the driver gives commands by voice, the NLU system searches tables that are related to navigation. This reduces speech recognition errors, since it reduces the number of confusable phrases stored in tables. If a particular table contains too many phrases, one could try to split the table into smaller tables with phrases belonging to different subtopics. For example, if there are too many phrases in a table relating to navigation, one can split the navigation table into tables where one table concerns questions how to get to some place, while the other table concerns questions about traffics (e.g., choosing the best route to minimize traffic).

LT (205) will preferably be configured for identifying similar drivers and similar environments and thus suggest actions that are based on analysis of similar driver behavior. LT (205) can then use this information to construct a workload representational "surface" as described above. Traffic events experienced by one driver could be used to properly label such workload "surfaces" for similar drivers.

A wide range of known mechanisms may be employed to promote interactions of LT (205) with drivers, such as disclosed in U.S. Pat. No. 6,505,208 ("Educational monitoring method and system for improving interactive skills based on participants on the network"). On the other hand, the adaptation of DSM components (e.g. NLU, speech recognition, language models) related to similarities between users may also be carried out in any of a wide range of suitable methods, including those described in the following U.S. Pat. No. 6,484,136 ("Language model adaptation via network of similar users") and U.S. Pat. No. 6,442,519 ("Speaker model adaptation via network of similar users").

Interface modules (203) preferably provide the ability for both the REM (202) and WM (201) modules in DSM (101) to interact (through communication module (204)) with drivers and the systems that aim to evaluate/decrease traffic accident risk. The interface module (203) preferably provides the rules and a format (e.g. API, or application programming interface) by which other modules and systems can interact with WM (201) and RES (202).

The following is an illustrative and non-restrictive list of modules, managers, services, databases and systems in FIG. 2 with which DSM (201) may interact:

Services (260): network (201), information (202), navigation (203), data collection (204), insurance (265).

Engines (270): speech (271), Text to Speech (TTS) (272), emotional detector (274), user identification/verification (275), NLU (276).

Sensors (280): biometrics (281), audio (282), car (283).

Managers (290): Dialog/conversational (291), resource (292), situation recognition (293), risk evaluator (294), workload (295), driver safety (296).

Systems (250): security (251), learning transformation, training (252), evaluation cognitive (253).

Databases (240): driver profiles (241), driver histories (242), insurance (243).

The categorization of elements such as those outlined above is of course not iron-clad, and can be arranged in essentially any suitable manner. For example, DSM (101) in one car can communication with one or more DSM's in other cars or servers.

Sensors in cars can preferably detect driver actions, workload and even mood, particularly as to how these might affect CI system performance. All changes for one client can preferably be transferable to other clients via the network. In other words, information regarding what happens with respect to one client (i.e., in one car) can be transferred to other clients (in other cars) over the network, whereby these other clients can use the transferred information in their own workload managers.

Biometrics data from biometrics sensors (281) can obtained from drivers or from passengers in different cars. A wide range of mechanisms can be utilized suitably in that connection, including those described in U.S. Pat. No. 6,421,453 ("Apparatus and methods for user recognition employing behavioral passwords").

User verification/identification (275) is helpful many situations. For example, it may be needed to identify a name of a person who drives a car and to build a driver history for a person or extract the correct information about the driver from his/her profile. This may be accomplished via a mechanism such as that described in U.S. Pat. No. 6,529,871 ("Apparatus and method for speaker verification/identification/classification employing non-acoustic and/or acoustic models and databases").

Figure 3:
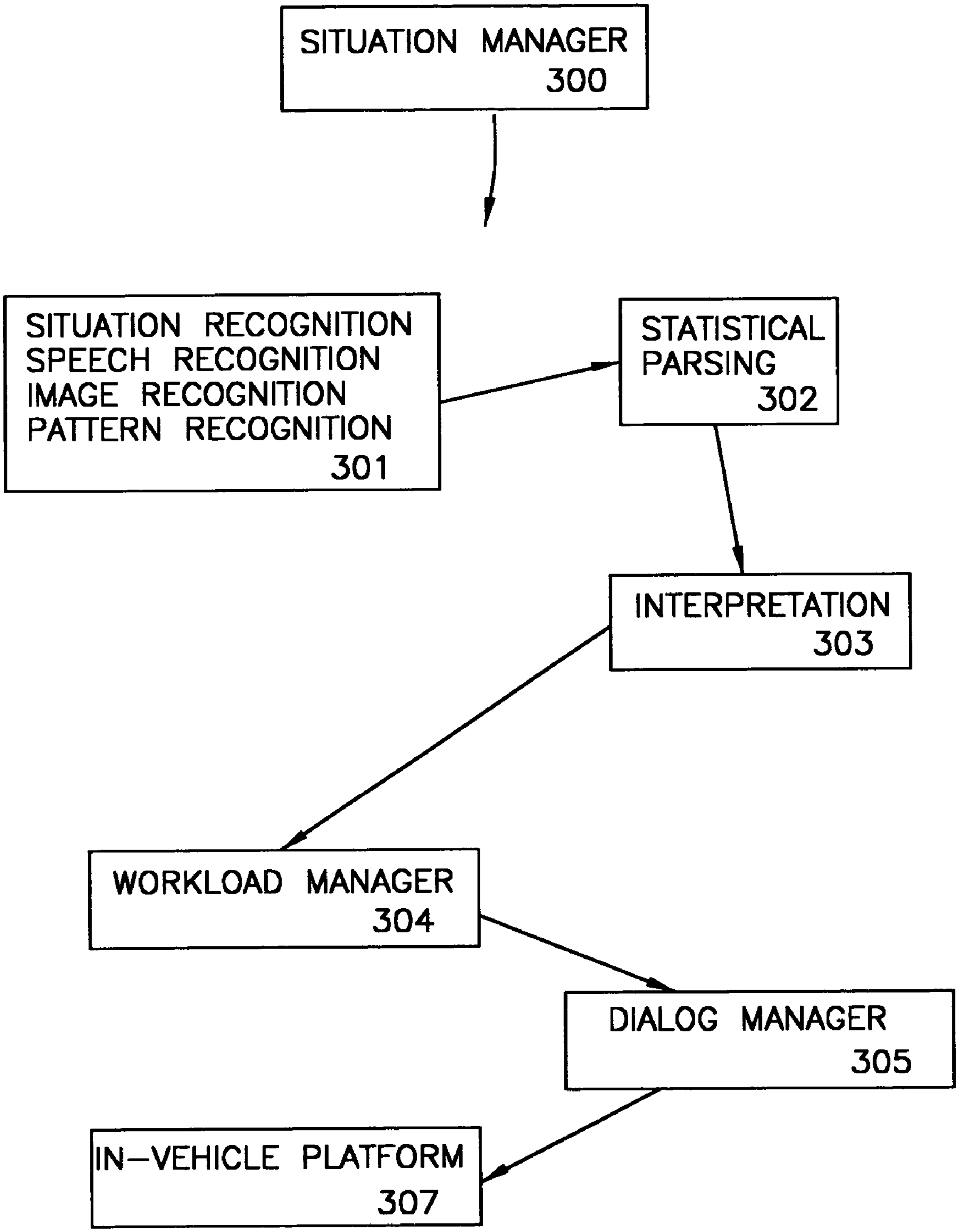
FIG. 3 is a general block scheme of a situation manager.

FIG. 3 is a general block scheme of a situation manager (300).

The main task of situation manager (300) is to recognize situations. It preferably receives as input various media and as output it produces a list of situations. Individual components in FIG. 3 will be explained in greater detail below.

Figure 4:
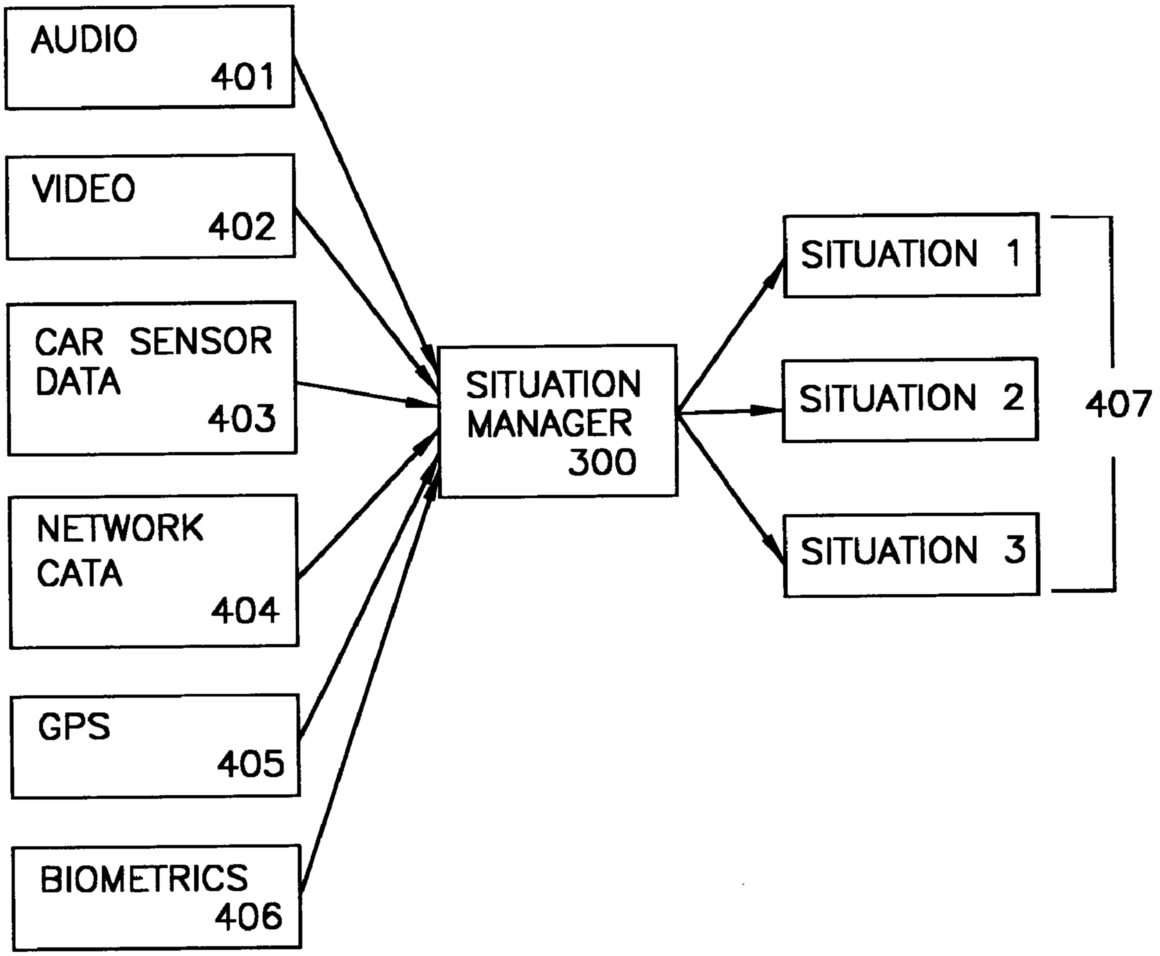
FIG. 4 is example of the input in a DSM.

FIG. 4 provides an example of input data that may processed by SM (300), e.g., audio (401), video (402), car sensor data (403), network data (404), GPS (405), biometrics (406). Indicated at (407) is the transmission of situations by SM (300). Such situations could be simple, complex or abstract. Simple situations could include, for instance: a dog locked in a car; a baby in a car; another car approaching; the driver's eyes are closed; car windows are closed; a key is left on a car seat; it is hot in a car; there are no people in a car; a car is located in New York City; a driver has diabetes; a driver is on the way home.

Complex situations could include, for example: a dog locked is locked in a car AND it is hot in a car AND car windows are closed; a baby is in a car AND there are no people in a car; another car is approaching AND the driver is looking in the opposite direction; a key is left on a car seat AND a driver is in the midst of locking a car; the driver is diabetic AND did not take a medicine for 4 hours.

Abstract situations could include, for example:

Goals: get to work, to cleaners, to a movie . . .

Driver preferences: typical routes, music to play, restaurants, shops . . .

Driver history: accidents, illness, visits . . .

In the context of different modules and systems in FIG. 2, situation information may well be needed, as in: Workload Manager (201); Dialog Manager (291); event management (297); learning driver behavioral patterns (252); providing driver safety and driver distraction detection (296); context management (298); and prioritizing message delivery (in 204).

For example, when the workload manager (201) performs a moment-to-moment analysis of the driver's cognitive workload, it may well deal with such complex situations as the following:

Driver speaks over phone AND car moves with high speed AND car changes lanes.

Driver asks for stock quotation AND presses brakes AND it is raining outside.

Another car approaches on the left AND the driver is playing a voice interactive game.

The dialog manager may well at times require uncertainty resolution involving complex situations, as exemplified in the following verbal expression:

Driver: "How do I get to Spring Valley Rd?"

Here, the uncertainty resides in the lack of an expressed (geographical) state or municipality. The uncertainty can be resolved through situation recognition; for example, the car may be in New York State already and it may be known that the driver rarely visits other states. (Here and in analogous examples, of course, the car's location can be known overall via essentially any suitable arrangement, such as a GPS system.) The concept associated with learning driver behavioral patterns (as at 252) above can be facilitated by a particular driver's repeated routines, which provides a good opportunity for the system's "learning" habitual patterns and goals. So, for instance, the system could assist in determining whether drivers are going to pick up their kids in time by, perhaps, rerouting a path from the cleaners, the mall, the grocery store, etc.

Such learning thus requires the recognition of repetitive situations. Returning to FIG. 3, (301) denotes the situation recognition module, which preferably uses known recognition technologies in all possible media such as speech recognition, image recognition and pattern recognition. SM module (301) preferably produces strings of units (labels) that have semantic meaning (like words from speech). These strings of units are preferably processed by a statistical parser (302) that permits the attachment of syntactic structures to these strings. Then, in the process of interpretation (303), strings of units get semantic meaning that "explain" situations. These situation interpretations are then preferably processed by various modules that are related to the in-vehicle platform (307), like the workload manager (304) and the dialog manager (305).

There are many references that describe suitable dialog managers for multimodal processing. The example of a dialog manager for speech can be found in " The IBM Personal Speech Assistant", "http://www.research.ibm.com/people/r/rameshg/cornerford-icassp2001.pdf".

There are many references on statistical parsing and on multimodal parsing and how to carry out interpretation. Examples of such technologies can be found in "http://www.research.att.com/~srini/Papers/MultiModal/coling2000.pdf" and other references found there.

In-vehicle platform implementation can be found in http://www-306.ibm.com/software/pervasive/news/press_releases/motorola_0101.shtml".

Figure 5:
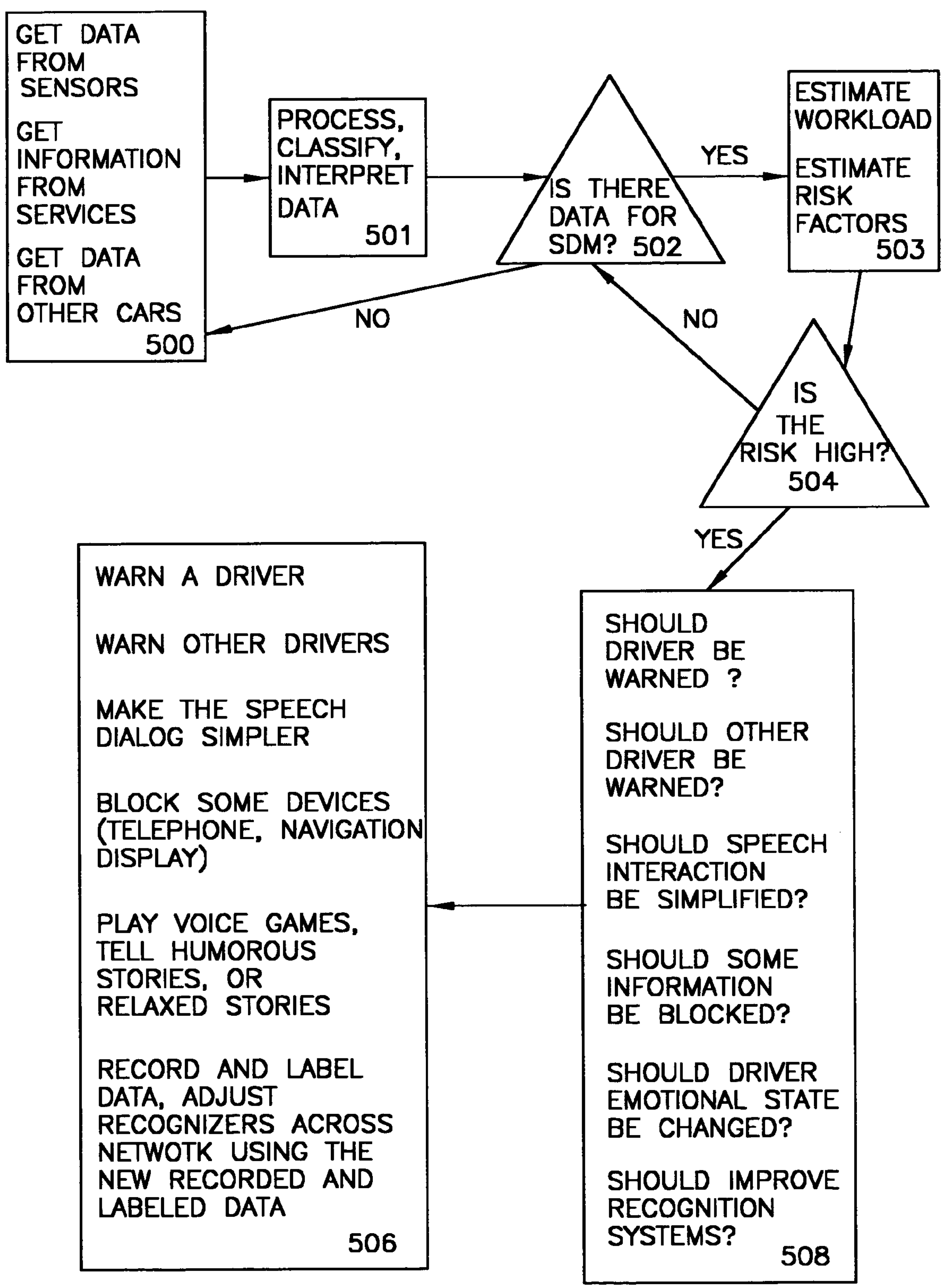
FIG. 5 is a flow chart illustrating a method employing a DSM.

FIG. 5 is a flow chart illustrating a method in accordance with at least one presently preferred embodiment of the present invention. It illustrates three basic processes: 1) the sending across a network, to services and other cars, SDM driver and car related information; 2) evaluation of risk factors using this information and the warning of drivers in cars or adjustment of car systems that interact with drivers; and 3) the recording and labeling of data, and modification of recognition components, across the network in other cars and services.

At (500), data are received from sensors, services and other cars. At (501) is the processing, classification and interpretation of this data. At (502) is verification as to whether there are data that are relevant to DSM. If no, the data collection continues at (500). If, yes, then the driver's workload and risk factors are estimated (503). In a query at (504), if the risk factor low, then return to (502) to check whether the SDM got new data. Otherwise, at (505) check which option (as illustrated) should be executed (e.g., warning a driver, simplification interface, etc.). The option chosen is then preferably processed at (506) by any of a number of possible implementations as illustrated.

It is to be understood that the present invention, in accordance with at least one presently preferred embodiment, includes at least one arrangement for communicating with a plurality of systems impacting driver safety; an arrangement for evaluating whether driver safety is at risk; and an arrangement for performing operations to ensure driver safety. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system for ensuring driver safety in a vehicle, said system comprising:

an arrangement for communicating with a plurality of systems impacting driver safety;

said communicating arrangement being adapted to receive, from the plurality of systems impacting driver safety; information on current conditions relevant to driver safety;

an arrangement for evaluating whether driver safety is at risk, based on information received by said communicating arrangement; and an arrangement for performing operations to ensure driver safety, responsive to said evaluating arrangement.

2. The system according to claim 1, wherein said evaluating arrangement is adapted to evaluate at least one of:

potential risk factors external to the driver; and a current workload being borne by the driver.

3. The system according to claim 1, wherein said arrangement for performing operations is adapted to perform at least one of:

communicating risk factors related to the vehicle to locations external to the vehicle;

minimizing driver distraction;

recording and storing over time behavioral data and environmental data related to at least one of: the vehicle and one or more drivers associated with the vehicle.

4. The system according to claim 1, wherein said communicating arrangement is adapted to communicate with at least one of: systems internal to the vehicle and systems external to the vehicle.

5. The system according to claim 4, wherein said communicating arrangement is adapted to communicate with systems associated with at least one other vehicle.

6. The system according to claim 1, wherein said system for ensuring driver safety comprises at least one of:

a computer system physically associated with the vehicle;

a computer system associated with a server external to the vehicle.

7. The system according to claim 1, wherein said communicating arrangement is adapted to communicate with at least one of the following systems impacting driver safety:

an arrangement for assessing the position of the vehicle;

an arrangement for assessing the position of one or more other vehicles;

one or more driver safety management systems external to the vehicle;

at least one arrangement for assessing a driver's state;

at least one arrangement for assessing the state of a driver in another vehicle;

at least one arrangement for assessing a driver's behavior;

at least one arrangement for assessing the behavior of a driver in another vehicle;

at least one arrangement for assessing a driver's interactions with the vehicle;

at least one arrangement for assessing the interactions of other drivers with other vehicles;

at least one arrangement with which the driver normally interfaces;

profile data relating to the driver;

profile data relating to a driver with a similar driving history or similar driving habits;

profile data relating to a driver in another vehicle;

at least one arrangement for assessing vehicle workload; and at least one arrangement assessing the workload of one or more other vehicles.

8. The system according to claim 7, wherein said at least one arrangement for assessing a driver's state comprises at least one arrangement for assessing driver biometrics.

9. The system according to claim 1, wherein said communicating arrangement is adapted to assess input from a workload representational surface which conveys an aggregate workload borne by both the driver and the vehicle.

10. The system according to claim 1, wherein said arrangement for performing operations is adapted to perform at least one of:

suggesting specific actions io a driver;

warning a driver;

communicating information relating to driver safety to an external location; and providing sensory stimulation to a driver.

11. The system according to claim 8, wherein said arrangement for performing operations is responsive to direction from one or more individuals at one or more locations external to the vehicle.

12. A system for ensuring driver safety in a plurality of vehicles, said system comprising:

an arrangement in each vehicle for communicating with a plurality of systems impacting the safety of drivers in the plurality of vehicles;

said communicating arrangements being adapted to receive, from the plurality of systems impacting the safety of drivers, information on current conditions relevant to driver safety;

an arrangement for evaluating whether the safety of one or more drivers is at risk, based on information received by said communicating arrangements; and an arrangement for performing operations to ensure driver safety, responsive to said evaluating arrangement.

13. A method of ensuring driver safety in a vehicle, said method comprising the steps of:

providing an arrangement for communicating with a plurality of systems impacting driver safety;

with the communicating arrangement, receiving, from the plurality of systems impacting driver safety, information on current conditions relevant to driver safety;

evaluating whether driver safety is at risk, based on information received by the communicating arrangement; and performing operations to ensure driver safety, responsive to the evaluating arrangement.

14. The method according to claim 13, wherein said evaluating step comprises evaluating at least one of:

potential risk factors external to the driver; and a current workload being borne by the driver.

15. The method according to claim 13, wherein said step of performing operations comprising at least one of:

communicating risk factors related to the vehicle to locations external to the vehicle;

minimizing driver distraction;

recording and storing over time behavioral data and environmental data related to at least one of: the vehicle and one or more drivers associated with the vehicle.

16. The method according to claim 13, wherein the communicating arrangement is adapted to communicate with at least one of: systems internal to the vehicle and systems external to the vehicle.

17. The method according to claim 16, wherein the communicating arrangement is adapted to communicate with systems associated with at least one other vehicle.

18. The method according to claim 13, wherein said step of ensuring driver safety comprises providing at least one of:

a computer system physically associated with the vehicle;

a computer system associated with a server external to the vehicle.

19. The method according to claim 13, wherein the communicating arrangement is adapted to communicate with at least one of the following systems impacting driver safety:

an arrangement for assessing the position of the vehicle;

an arrangement for assessing the position of one or more other vehicles;

one or more driver safety management systems external to the vehicle;

at least one arrangement for assessing a driver's state;

at least one arrangement for assessing the state of a driver in another vehicle;

at least one arrangement for assessing a driver's behavior;

at least one arrangement for assessing the behavior of a driver in another vehicle;

at least one arrangement for assessing a driver's interactions with the vehicle;

at least one arrangement for assessing the interactions of other drivers with other vehicles;

at least one arrangement with which the driver normally interfaces;

profile data relating to the driver;

profile data relating to a driver with a similar driving history or similar driving habits;

profile data relating to a driver in another vehicle;

at least one arrangement for assessing vehicle workload; and at least one arrangement assessing the workload of one or more other vehicles.

20. The method according to claim 19, wherein the at least one arrangement for assessing a driver's state comprises at least one arrangement for assessing driver biometrics.

21. The method according to claim 13, wherein the communicating arrangement is adapted to assess input from a workload representational surface which conveys an aggregate workload borne by both the driver and the vehicle.

22. The method according to claim 13, wherein said step of performing operations comprises performing at least one of:

suggesting specific actions to a driver;

warning a driver;

communicating information relating to driver safety to an external location; and providing sensory stimulation to a driver.

23. The method according to claim 20, wherein said step of performing operations is responsive to direction from one or more individuals at one or more locations external to the vehicle.

24. A method of ensuring driver safety in a plurality of vehicles, said method comprising the steps of:

providing an arrangement in each vehicle for communicating with a plurality of systems impacting the safety of drivers in the plurality of vehicles;

with the communicating arrangements, receiving, from the plurality of systems impacting driver safety, information on current conditions relevant to driver safety;

evaluating whether the safety of one or more drivers is at risk, based on information received by the communicating arrangements; and performing operations to ensure driver safety, responsive to the evaluating arrangement.

25. A program storage device readable by machine, tangibly embodying a program of instructions executable by the machine to perform method steps ensuring driver safety in a vehicle, said method comprising the steps of:

providing an arrangement for communicating with a plurality of systems impacting driver safety;

with the communicating arrangement, receiving, from the plurality of systems impacting driver safety, information on current conditions relevant to driver safety;

evaluating whether driver safety is at risk, based on information received by the communicating arrangement; and performing operations to ensure driver safety, responsive to the evaluating arrangement.

26. A program storage device readable by machine, tangibly embodying a program of instructions executable by the machine to perform method steps for ensuring driver safety in a plurality of vehicles, said method comprising the steps of:

providing an arrangement in each vehicle for communicating with a plurality of systems impacting the safety of drivers in the plurality of vehicles;

with the communicating arrangements, receiving, from the plurality of systems impacting driver safety, information, on current conditions relevant to driver safety;

evaluating whether the safety of one or more drivers is at risk, based on information received by the communicating arrangements; and performing operations to ensure driver safety, responsive to the evaluating arrangement.

* * * * *